(12) United States Patent
Tomasi

(10) Patent No.: US 7,212,663 B2
(45) Date of Patent: May 1, 2007

(54) CODED-ARRAY TECHNIQUE FOR OBTAINING DEPTH AND OTHER POSITION INFORMATION OF AN OBSERVED OBJECT

(75) Inventor: Carlo Tomasi, Palo Alto, CA (US)

(73) Assignee: Canesta, Inc., Sunnyvale, CA (US)

( * ) Notice: Subject to any disclaimer, the term of this patent is extended or adjusted under 35 U.S.C. 154(b) by 744 days.

(21) Appl. No.: 10/600,744

(22) Filed: Jun. 19, 2003

(65) Prior Publication Data

US 2004/0005092 A1 Jan. 8, 2004

Related U.S. Application Data

(60) Provisional application No. 60/390,232, filed on Jun. 19, 2002.

(51) Int. Cl.
*G06K 9/00* (2006.01)

(52) U.S. Cl. .................................. 382/154; 382/106

(58) Field of Classification Search ..................... None
See application file for complete search history.

(56) References Cited

U.S. PATENT DOCUMENTS 6,341,016 B1    1/2002  Malione
6,965,690 B2 *  11/2005  Matsumoto .................. 382/154

FOREIGN PATENT DOCUMENTS

DE          19638727 A1     3/1998

OTHER PUBLICATIONS

Batlle, J. et al., "Recent progress in coded structured light as a technique to solve the correspondence problem: A Survey—image segmentation techniques", Pattern Recognition, Pergamon Press, Inc., Elmsford, NY, vol. 31, No. 7, Jul. 31, 1998, pp. 963-982 (XP004131001).

Griffin, P.M. et al., "Generation of uniquely encoded light patterns for range data acquisition", Pattern Recognition, Pergamon Press, Inc., Elmsford, NY, vol. 25, No. 6, Jun. 1, 1992, pp. 609-616 (XP000290629).

Morano, R. A., et al., "Short papers structured light using pseudo-random codes", IEEE Transactions on Pattern Analysis and Machine Intelligence, IEEE Inc. NY, vol. 20, No. 3, Mar. 1, 1998, pp. 322-327 (XP000767921).

* cited by examiner

*Primary Examiner*—Joseph Mancuso
*Assistant Examiner*—Alex Liew
(74) *Attorney, Agent, or Firm*—Shemwell, Mahamedi LLP

(57) ABSTRACT

A projection array is provided that comprises a plurality of discrete projection elements. An image array is obtained of a scene with the light projected onto it that is coded using the projection array. Correspondence information is determined for each element in the image array, where the correspondence information can be used to determine which of the plurality of elements in the projection array corresponds to a particular image element. The determination of correspondence information for each element in the image array can be made independently of correspondence information for other elements in the image array.

37 Claims, 6 Drawing Sheets

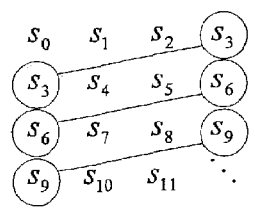
FIG. 7
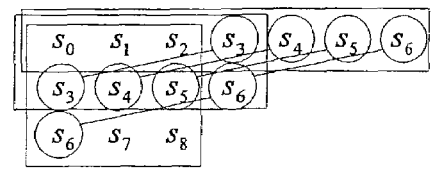
FIG. 8
$$\begin{array}{ccccccc}
s_0 & s_1 & s_2 & b_0 & s_3 & s_4 & s_5 & b_6 \cdots \\
s_3 & s_4 & s_5 & b_1 & s_6 & s_7 & s_8 & b_7 \cdots \\
s_6 & s_7 & s_8 & b_2 & s_9 & s_{10} & s_{11} & b_8 \cdots \\
b_3 & b_4 & b_5 & d & b_9 & b_{10} & b_{11} & d \cdots
\end{array}$$
FIG. 9
FIG. 10
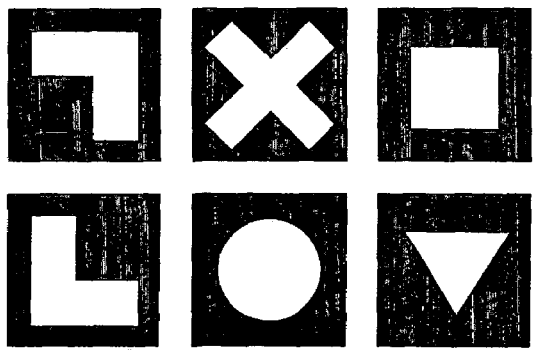
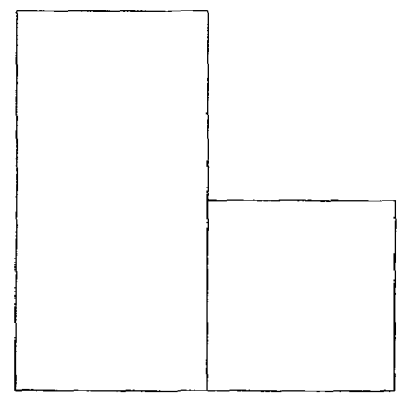
FIG. 11

CODED-ARRAY TECHNIQUE FOR OBTAINING DEPTH AND OTHER POSITION INFORMATION OF AN OBSERVED OBJECT

RELATED APPLICATIONS

This application claims benefit of priority to Provisional U.S. Patent Application No. 60/390,232, filed Jun. 19, 2002, entitled "A Coded-Grid Depth Sensor," and naming Carlo Tomasi as an inventor. The aforementioned priority application is hereby incorporated by reference in its entirety for all purposes.

FIELD OF THE INVENTION

The present invention relates to sensor systems that observe objects. In particular, the present invention relates to a method and apparatus for obtaining depth and other position information of an observed object.

BACKGROUND OF THE INVENTION

Three-dimensional sensor systems are increasingly being used in a wide-array of applications. In one general application, a three-dimensional sensor system is used to determine the shape and/or features of an object positioned in a scene of the sensor system's view. Many methods have been proposed for implementing sensor systems for sensing shapes and features in three-dimensions. Such methods typically require measurements of the time-of-flight or phase shift of light reaching the scene from the sensor system. Other such methods use structured-light or passive stereoscopic methods.

Structured-light methods have had success because of their superior accuracy and resolution. Their most important drawback, on the other hand, is that they require the projection of a moving beam or pattern of light onto the observation scene. The need for a moving light pattern implies some mechanical moving component, which adds to the cost or detracts from the reliability of the apparatus. Even more importantly, the need to scan the scene with a moving light beam, or to project sequences of light patterns, means that one single depth map of the scene can only be captured over a period of time, often several seconds, and in some instances even minutes. As a result, structured-light systems are often poorly suited for real-time applications, in which the position and configuration of the object of interest may change rapidly.

SUMMARY OF THE INVENTION

Embodiments of the invention provide for detecting characteristics of an object. According to one embodiment, a projection array is obtained that corresponds to coded light projected onto a scene containing the object. The projection array may comprise a plurality of discrete projection elements. An image array is obtained of the scene with the coded light projected onto it. A plurality of image elements are identified from the image array. Correspondence information is determined for each image element that is identified from the image array, where the correspondence information can be used to determine which of the plurality of projection elements corresponds to that image element. In one embodiment, the determination of correspondence information is made independently of other image elements in the image array for each element in the image array.

In another embodiment, a coded light pattern can be created on a scene, by creating a sequence of values that include a plurality of subsequences. Each subsequence may identify one or more elements of a projection array. A value may be assigned to a characteristic in a set of optically distinguishable characteristics. Then, light may be projected a pattern in order to create at least a portion of the pattern on the scene. The sequence is encoded into the pattern based on the value assigned to each characteristic in the set.

Embodiments of the invention may be implemented on a system that includes a projector, a camera or other optical sensor, and a processor. Furthermore, embodiments of the invention may be embodied as a set of instructions that can be carried on a computer-readable medium. Such instructions may be executable by one or more processors to perform steps such as described above.

A computer-readable medium may include any medium that can hold instructions that are retrievable and executable by a processor. Examples of a computer-readable medium include memory, optical memory, signal mediums that hold instructions, and external computer memory or storage.

BRIEF DESCRIPTION OF THE DRAWINGS

Embodiments of the invention are illustrated by way of example, and not by way of limitation, in the figures of the accompanying drawings. Like reference numerals are intended to refer to similar elements among different figures.

FIG. 7 illustrates a first error detection scheme for use with an embodiment of the invention.

FIG. 8 illustrates a second error detection scheme for use with an embodiment of the invention.

FIG. 9 illustrates a third error detection scheme that uses a parity value, under an embodiment of the invention.

FIG. 10 illustrates geometric symbols and shapes for encoding a projection array, under embodiments of the invention.

FIG. 11 illustrates another set of geometric shapes for encoding a projection array, under embodiments of the invention.

DETAILED DESCRIPTION OF THE INVENTION

Figure 1:
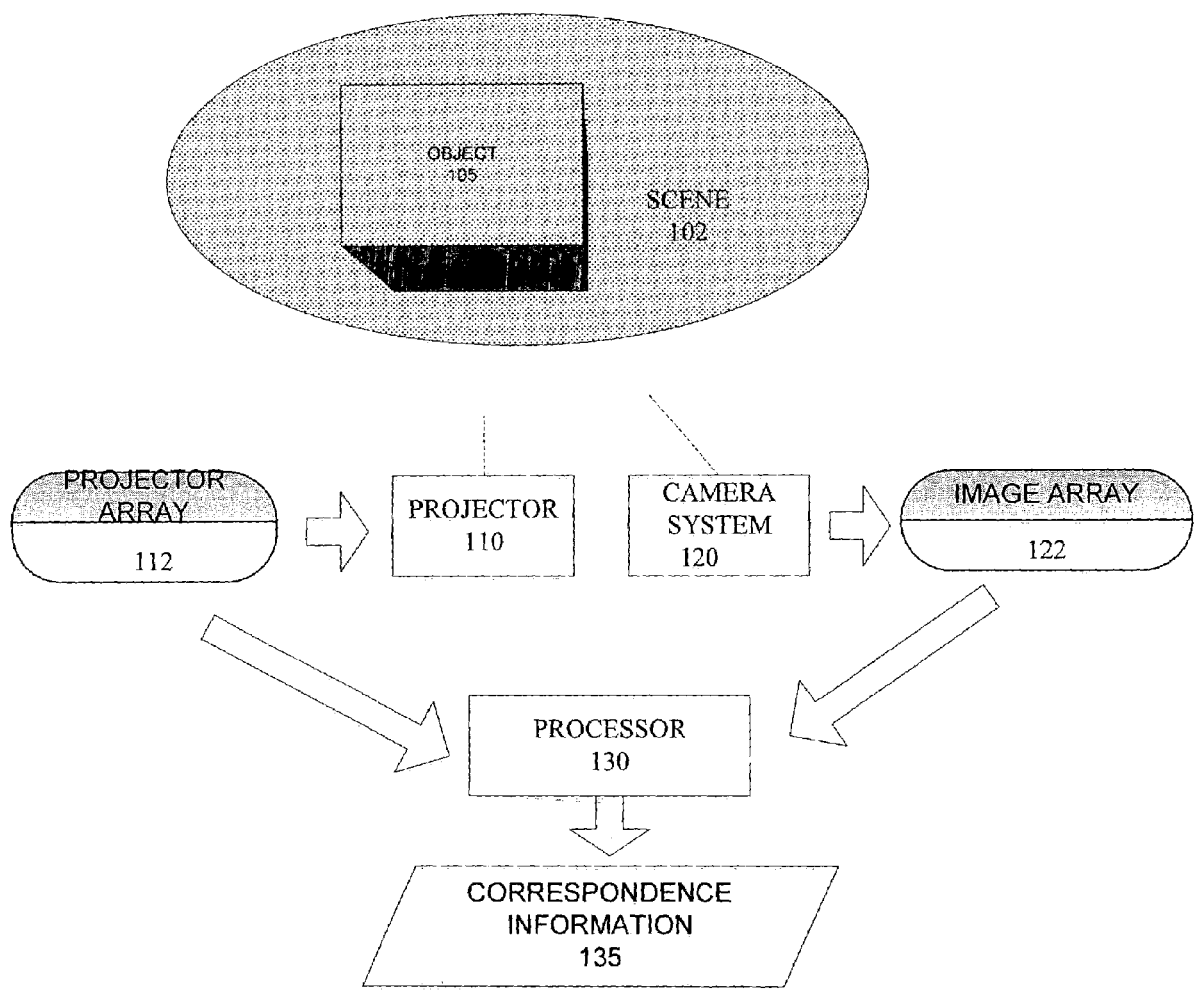
FIG. 1 is a block diagram of an image correspondence system, under an embodiment of the invention.

Embodiments of the invention describe a coded-array technique for obtaining depth and other position information for an observed object. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Embodiments of the invention provide for determining information about discrete points on an observed object by analyzing an image of the object and referencing the image to known characteristics of light projected onto the object. In one embodiment, light is coded to provide discrete identifiable elements. The coded light is then projected onto an object or scene. A camera or similar sensing apparatus obtains an image of the object. The elements of the coded light are captured in the image. The captured elements in the image can be referenced to the discrete elements provided by the coded projection in order to obtain the information about the discrete points. One embodiment provides that the projection is coded so that each element detected from the image can be associated with a corresponding element of an array through which light is projected. Furthermore, each element appearing in the image can be associated with the corresponding element provided by the projected light independent of knowing the corresponding projection element of any other image element.

Accordingly, embodiments of the invention provide a solution for what is termed in the vision perception and optical art as the "correspondence problem". There have been past approaches that have contemplated obtaining, for example, three-dimensional position information about an observed object by projecting light as an array with a grid of known points, and then obtaining an image of the array reflected off of the object. But past approaches have had difficulty in determining which elements in the projection array correspond to elements in the image array. This is the "correspondence problem". If a processor was able to determine which points of a projected pattern are present at individual points in the image of the pattern, that is, if the unit were able to solve the so-called correspondence problem, then it would be a simple matter of triangulation geometry to determine the distance of each projected point from a camera that captures the image, assuming that the relative position, orientation, and optical parameters of both the camera and the projector are known. Conventional structured-light shape sensors work according to this triangulation principle.

Lighting the scene with a-single beam at any one time usually circumvents the correspondence problem. One beam projects, say, a single plane of light, which forms a curve when it intersects the surface of the object of interest. If the plane is vertical, and camera and projector are side to side, then only at most one point of the curve appears in any given row of the camera's image, and the correspondence problem becomes trivial. In other words, time is used to disambiguate one curve from another in standard structured-light systems: rather than projecting several curves simultaneously, and facing the hard correspondence problem in which several luminous points appear in each image row, a standard structured-light system uses the time at which the camera detects a single curve in order to tell which of the many curves projected by the light source is visible in which image. If the camera and the light source are synchronized, then the correspondence problem can be entirely avoided, and triangulation becomes possible.

There is a time and resource penalty associated with using a single plane of light to view an object. A beam of structured light has to scan the entire observed object. This takes time, and often makes the approach impractical for many applications.

In contrast to past approaches, embodiments of the invention project the entire light pattern at once. The projected light pattern is designed to that the correspondence problem can be readily solved.

One benefit of solving the correspondence problem is that three-dimensional position information about discrete points on the observed object can be obtained from the correspondence solution. Other information, including information that is dependent on a distance between the discrete points and a reference, may also be determined from the correspondence solution.

Figure 2:
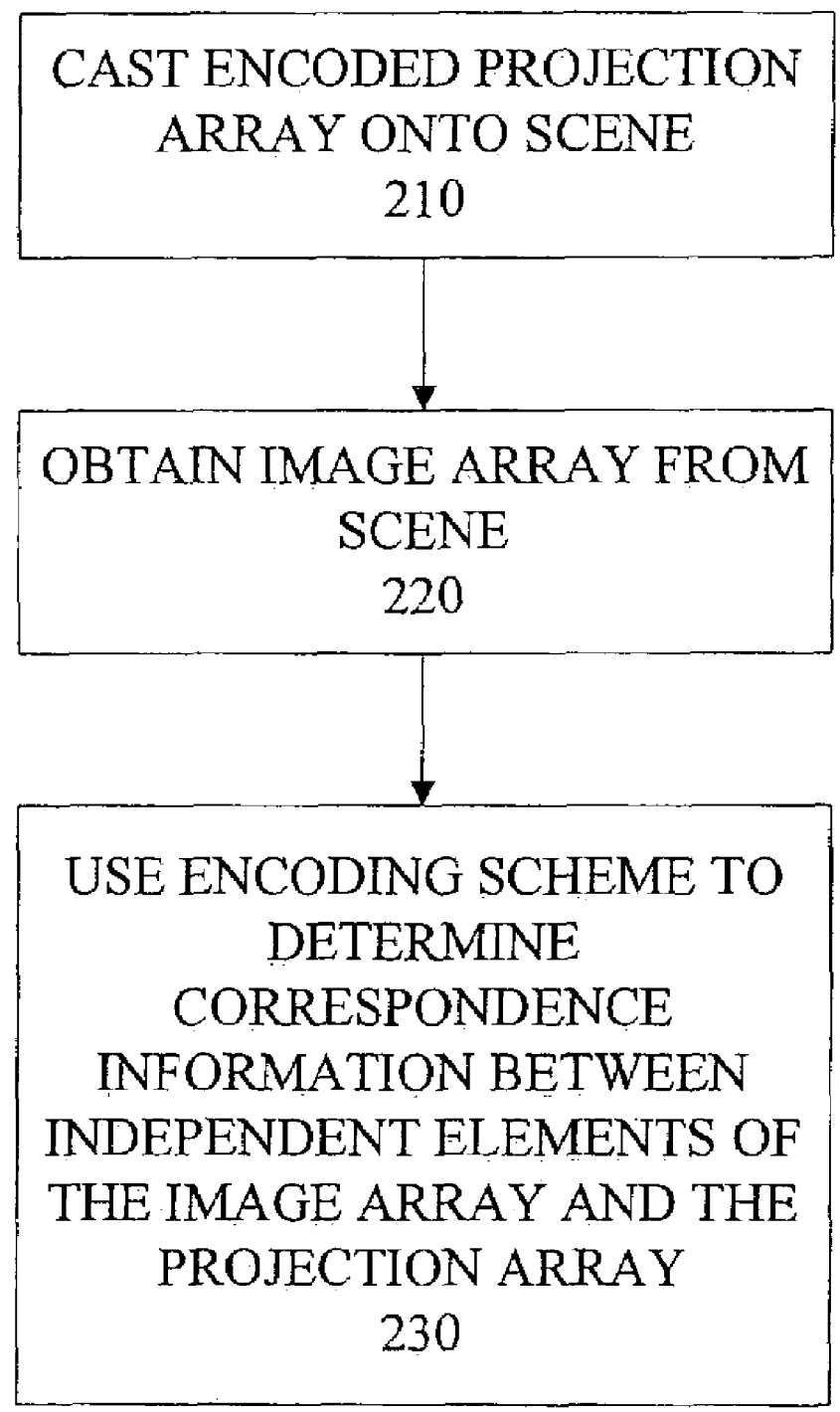
FIG. 2 illustrates a method for determining correspondence between an image array and a projection array, such as provided with an image correspondence system described in FIG. 1.
Figure 3:
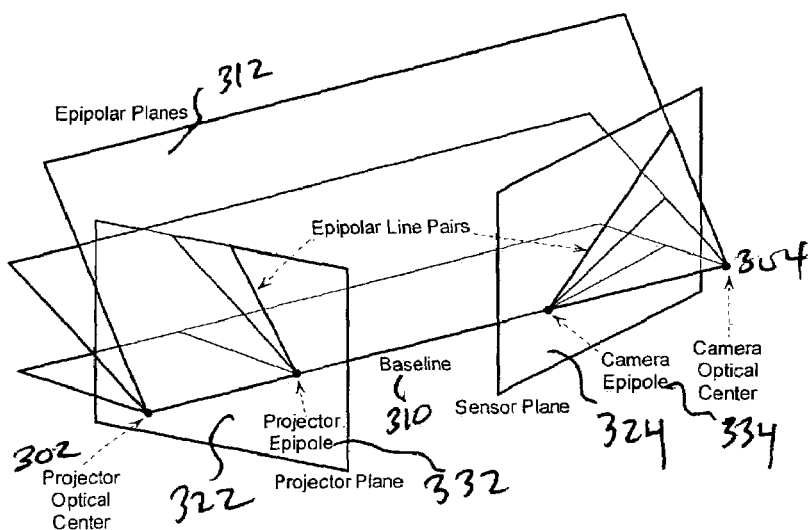
FIG. 3 is a diagram illustrating the concept of epipolar geometry, as it applies to embodiments of the invention.
Figure 5:
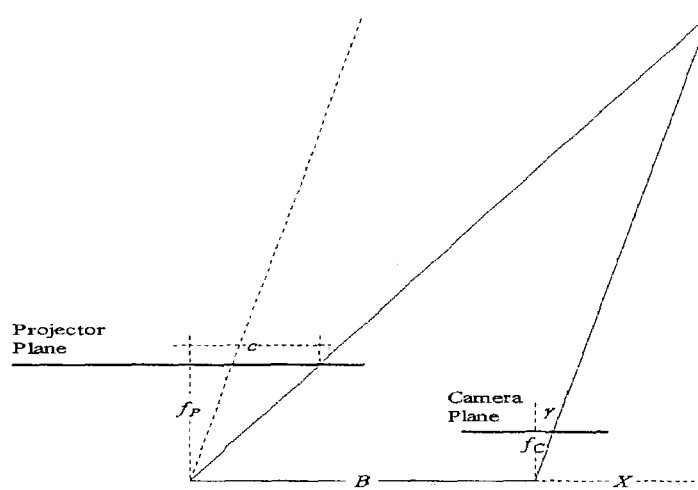
FIG. 5 illustrates principles for implementing triangulation for determining depth information, using correspondence information between an image array and a projection array.
Figure 6:
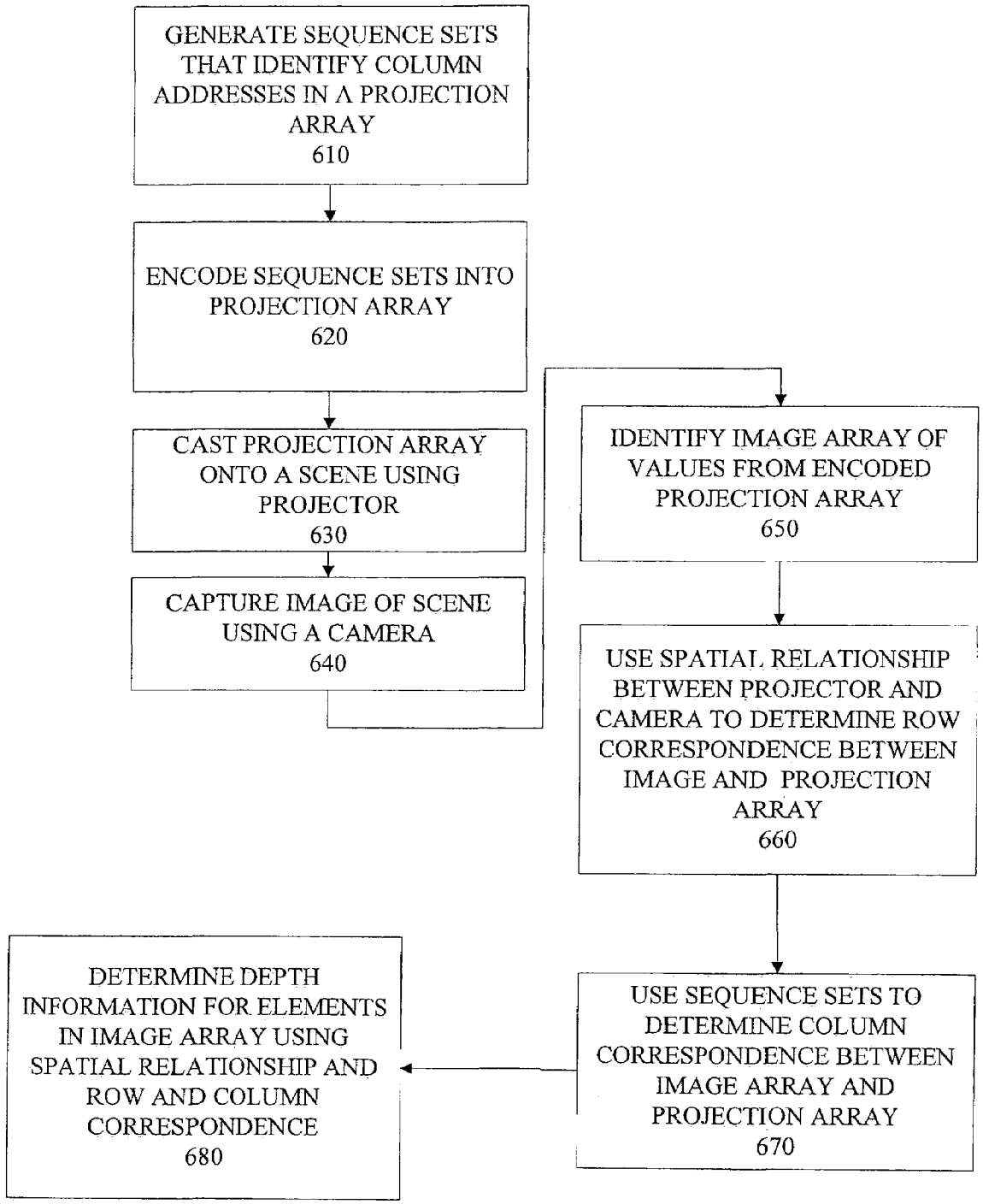
FIG. 6 illustrates a method for obtaining depth information for an observed object.

In the following description, FIG. 1 and the accompanying text describes components of a system that can be employed according to an embodiment of the invention. FIG. 2 and FIG. 3 and the accompanying text detail respective methods for determining the column and row addresses or coordinates of an image array in relation to a projection array. FIGS. 4–5 and the accompanying text illustrate concepts behind determining the row coordinates of elements in an image array. FIG. 6 and the accompanying text illustrate a method for obtaining depth information using addresses of elements in the image array. FIGS. 7–12 and the accompanying text illustrate various specific implementation details and provide examples.

General System and Methodology Description

FIG. 1 describes an image correspondence system, under an embodiment of the invention. As will be described, an image correspondence system may be used to optically observe an object and determine three dimensional features, characteristics and other information of the object.

The components of such a system include a projector 10, a camera 120 and a processor 130. The projector 110 and the camera 120 are each aligned in a direction of a scene 102, where an object 105 is provided. In an embodiment, a known spatial or geometric relationship exists between the camera 120 and the projector 110. Specifically, the camera 120 and the projector 110 may be placed in a side-by-side orientation with respect to the scene 102. To simplify computations, an optical center of the projector 110 and an optical center of the camera 120 may have parallel optical axes.

The projector 110 projects an array 112 of coded light onto the scene 102. Coded light refers to light that is structured or patterned so that it can be represented as propagating from projector 110 as an array with identifiable array elements. The projector 110 includes a light-emitting source and some mechanism that causes light projecting from it to be coded. For example, projector 110 may include a bulb and a slide having a pattern. When the light passes through the slide, the contents of the slide code the light. In one embodiment, light is projected as a grid when directed at the scene 102, so that grid points are then identifiable on the scene 102. The light may be coded so that the select grid points are identifiable, or otherwise distinguishable from each other. The projection array 112 may correspond to a data structure that represents a plane of light propagating from the projector 110 after being structured into an array. In another embodiment, the projection array 112 may correspond to a tangible medium, such as a slide, that includes a grid pattern for producing the coded light structure.

In one embodiment, the scheme for coding the light provides that each grid point is assigned a value, and a sequence of values from a set of congruent grid points identifies one individual grid point amongst the set. The particular manner in which light can be coded to reflect sequence values for individual elements of an array is described in with FIGS. 7–12. In addition, the manner in which the light may be coded may vary. In one embodiment, the light is structured so that each grid point is assigned one symbol or geometric identifier from a set of two or more such identifiers. In another embodiment, grid points are colored to have one color from a set of two or more colors. Still further, grid points may be assigned a size from a set of two or more sizes. Other variations and identifiers are possible. In the end, the coding scheme selected assigns values to specific characteristics of light propagated form the projector 110. In a binary scheme, two or three values (0,1 and parity) are utilized.

The projector 110 may be similar to a slide projector in applications where electrical power is readily available. The coding may be provided by a slide containing a pattern, which in turn causes the projected light to have a pattern. In this case, the projection array 112 may correspond to a specific pattern formed on the slide. If it is necessary to save energy, perhaps because the depth sensor is to work in connection with a portable device, it is more effective to generate the projection array 112 by diffracting a light source, such as a light emitting diode (LED) or laser, into the desired pattern. The advantage of this configuration is its greater power efficiency, because all the light from the source reaches the scene 102, rather than being reflected back by the dark portions of a slide.

The pattern projected on the scene 102 may be visible, or it could be formed with invisible light when it is undesirable to reveal the array. For example, infrared light may be used when the infrared spectrum is easier to distinguish from ambient light. The projected light may be pulsed in synchrony with a shutter in the camera 120, so as to optimize the ratio of projected versus ambient light.

The camera 120 captures an image of the scene 102. When coded is light is cast on the scene 102, the resulting image has a representation of the projection array 112. The image of the projection array 112 is at least partially captured in image array 122. The camera 120 may include a lens (not shown) and a frame grabber which obtains data corresponding to image array 122. In one embodiment, the image array is a digital representation of the coded light on the scene 102 and the object 105. The depth of field of the camera should be sufficient to distinguish the different types of code in the light coding emitted from projector 110. For example, in the case where the light coding corresponds to geometric shapes, the camera 120 is sufficient to distinguish amongst the different symbols used. Enough depth of field in turn requires a sufficient amount of light for a camera lens with a relatively small aperture. In one embodiment, the camera 120 operates in black and white to identify geometric shapes or symbols that are of the order of one pixel. Alternatively, the camera 120 operates in color to identify colored elements of the pattern provided by projector 110, where each array element occupies pixels of the order of less than ten pixels of the camera's pixel panel (not shown). In one embodiment, the camera 120 is of a charged couple device (CCD) or complimentary metal-oxide semiconductor (CMOS) design.

Embodiments of the invention provide that processor 135 receives data representing image array 122 and projection array 112. Using techniques such as described in FIGS. 2 and 3, the processor 130 determines a correspondence between an element of the image array 122 and an element of the projection array 112. This correspondence is referred to as correspondence information 135. In one embodiment, processor 130 determines a corresponding element in the projection array 112 for each element in the image array 122. Furthermore, the corresponding element in the projection array 112 may be determined for any element in the image array 122, independently of any correspondence between any other elements in the image array 122 and the projection array 112. Thus, an embodiment such as described with FIG. 1 and elsewhere in this application does not require a relationship to be known amongst elements in the image array in order to determine the correspondence information.

Specific techniques and solutions to problems encountered in determining the correspondence information 135 are described below.

Obtaining Correspondence Information

FIG. 2 illustrates a method for determining correspondence between image array 122 and projection array 112. The correspondence between the image array 122 and the projection array 112 can be used to determine other information, such as depth information for elements of the image array 122. In this way, a three-dimensional image of the scene 102, including the object 105, can be obtained. Among other advantages, the three-dimensional image is obtained quickly, with less demand on the projector, camera and processing resources.

In step 210, an encoding scheme is developed for the projection array. In one embodiment, the encoding scheme comprises of sets of binary sequences that are non-repeating, so that each sequence in the set is a unique identifier for that set. A set of binary sequence may be determined as follows. The sequence $s_1, \ldots, s_K$ of K bits is non-N-repeating if no subsequence of N bits ever repeats itself within the sequence. For instance, the following sequence of K=127 bits is non-7-repeating:

1010101001100111011101001011000110111101010101
0110010010001110000101111100101011001101000
100111100010100001100000100000111111

It is easy to verify that no subsequence of seven contiguous bits appears twice in the overall sequence set. This is the case even if the sequence is considered to be periodic, that is, its end is concatenated with its beginning.

There are many ways to generate such sequences, some of which are explained in the book by S. W. Golomb, *Shift Register Sequences,* Holden Day, San Francisco, 1967 (incorporated by reference herein for purpose of generating binary encoding sequences). A popular way is to use a so-called Linear-Feedback Shift Register (LFSR): a binary shift register with N bits $b_0, \ldots, b_{N-1}$, is initialized to any set of values, other than all zeros. At each of K iterations, a new bit is computed according to the following rule:

$$b = \sum_{n=0}^{N-1} p_n b_n.$$

In this expression, the binary coefficients $p_0, \ldots, p_{N-1}$ are fixed and are determined appropriately so as to obtain the desired sequence (see Golomb's book for a theory of how to do compute these coefficients). The register is then shifted by one position, $b_{N-1}=b_{N-2}, \ldots, b_1=b_0$, and the newly computed bit is placed in the first position of the register, $b_0=b$. The output sequence is the sequence of the newly computed bits.

For some values of N, the longest possible sequence of $K=2^N-1$ bits can be generated in this way. For instance, all Fermat primes, that is, for prime numbers N that are themselves of the form $N=2^m-1$. As an example, the number $N=7=2^3-1$ is such a number, and was used in the example above to yield a sequence of $K=2^N-1=2^{2^3}-1=127$ bits. The polynomial coefficients for the example were $$p_0=p_6=1, p_1=p_2=p_3=p_4=p_5=0.$$

Other methods exist for generating sequences of this type. For applications described herein, it is not necessary to obtain the longest possible non-repeating sequence, but merely one that is long enough to avoid ambiguity.

In step 220, the code developed in step 210 is encoded into the projection array. Discrete elements that comprise the projection array are assigned binary values that correspond to the coding scheme developed in the previous step. Each binary value (0 or 1) is represented by an optical identifier. In one embodiment, the optical identifier corresponds to a set of two symbols or shapes, where each symbol/shape in the set represents one of the two binary values. FIGS. 10–11 illustrate some symbols or shapes that can be used as the optical identifiers. Another embodiment assigns colors to the set representing binary values (e.g. red and blue).

In an embodiment, the projection array is coded to distinguish the column address. As will be described with FIG. 3 and elsewhere in this application, geometric or spatial relationships may be used to correlate each row of the image array 122 to a corresponding row of the projection array 112. In an embodiment, the projection array 112 is dimensioned so that the number of columns correspond to the largest non-repeating sequence, which in the example provided above is 133 (127 plus 6 end elements). But other embodiments may use more than the longest non-repeating sequence. For example, multiples of the non-repeating sequence may be applied for each column of the projection array 112.

Step 230 provides that image array 122 is obtained from the scene. The image array 122 may be obtained by camera 120 when viewed over the scene 102. Each element in the image array 122 may correspond to an image of one of the optical identifiers cast with the projection array 112.

In step 240, correspondence information between independent elements of the image array 122 and the projection array 112 is determined through the encoding scheme. In an embodiment, the correspondence information is an address, provided in row and column coordinates, that identifies an image array element in terms of a projection array element. In an embodiment, the row address can be inferred from geometry alone, and more specifically from the relative position and orientation of the projector 110 that generates the pattern and of the camera 120 that records its image. A description of this geometry is called the epipolar geometry of the projector-camera pair, which is known in the art. According to epipolar geometry, given the image position of a local pattern, there is only one row of the array that the pattern can belong to. Epipolar geometry determines which row this is.

For the column addresses, each image element is identified by a subsequence of the sequence provided with the projection array. Given a non-N-repeating sequence of length K, one can determine at least the column address k of any of its subsequences $S_k$ of length N, that is, the starting place of $S_k$ within the sequence, in several ways. For instance, one could run the generation algorithm explained with step 210, and count the number i of iterations needed until the contents of the shift register are equal to $S_k$. The column address k is then $$k=(i-N+1) \bmod K.$$

Alternatively, one can build a table of addresses ahead of time. For instance, Table 1 lists the addresses for the subsequences of length N=7 within the sequence in the example above, cross-referenced against the column coordinate.

TABLE 1

Addresses for the $K=127$ subsequences of length $N=7$ in the sample sequence introduced previously:

| | |
|---|---|
| (0000001) | 115 |
| (0000010) | 109 |
| (0000011) | 116 |
| (0000100) | 110 |
| (0000101) | 61 |
| (0000110) | 103 |
| (0000111) | 117 |
| (0001000) | 111 |
| (0001001) | 87 |
| (0001010) | 97 |
| (0001011) | 62 |
| (0001100) | 104 |
| (0001101) | 28 |
| (0001110) | 55 |
| (0001111) | 118 |
| (0010000) | 112 |
| (0010001) | 52 |
| (0010010) | 49 |
| (0010011) | 88 |
| (0010100) | 98 |
| (0010101) | 72 |
| (0010110) | 22 |
| (0010111) | 63 |
| (0011000) | 105 |
| (0011001) | 7 |
| (0011010) | 81 |
| (0011011) | 29 |
| (0011100) | 56 |
| (0011101) | 11 |
| (0011110) | 91 |
| (0011111) | 119 |
| (0100000) | 113 |
| (0100001) | 101 |
| (0100010) | 85 |
| (0100011) | 53 |
| (0100100) | 50 |
| (0100101) | 20 |
| (0100110) | 5 |
| (0100111) | 89 |
| (0101000) | 99 |
| (0101001) | 3 |
| (0101010) | 1 |
| (0101011) | 73 |
| (0101100) | 23 |
| (0101101) | 41 |
| (0101110) | 75 |
| (0101111) | 64 |
| (0110000) | 106 |
| (0110001) | 25 |
| (0110010) | 46 |
| (0110011) | 8 |
| (0110100) | 82 |
| (0110101) | 38 |
| (0110110) | 43 |
| (0110111) | 30 |
| (0111000) | 57 |
| (0111001) | 77 |
| (0111010) | 16 |
| (0111011) | 12 |
| (0111100) | 92 |
| (0111101) | 33 |
| (0111110) | 66 |
| (0111111) | 120 |
| (1000000) | 114 |
| (1000001) | 108 |
| (1000010) | 60 |
| (1000011) | 102 |
| (1000100) | 86 |
| (1000101) | 96 |

TABLE 1-continued

Addresses for the $K = 127$ subsequences of length $N = 7$ in the sample sequence introduced previously:

| Subsequence | Address |
| --- | --- |
| (1000110) | 27 |
| (1000111) | 54 |
| (1001000) | 51 |
| (1001001) | 48 |
| (1001010) | 71 |
| (1001011) | 21 |
| (1001100) | 6 |
| (1001101) | 80 |
| (1001110) | 10 |
| (1001111) | 90 |
| (1010000) | 100 |
| (1010001) | 84 |
| (1010010) | 19 |
| (1010011) | 4 |
| (1010100) | 2 |
| (1010101) | 0 |
| (1010110) | 40 |
| (1010111) | 74 |
| (1011000) | 24 |
| (1011001) | 45 |
| (1011010) | 37 |
| (1011011) | 42 |
| (1011100) | 76 |
| (1011101) | 15 |
| (1011110) | 32 |
| (1011111) | 65 |
| (1100000) | 107 |
| (1100001) | 59 |
| (1100010) | 95 |
| (1100011) | 26 |
| (1100100) | 47 |
| (1100101) | 70 |
| (1100110) | 79 |
| (1100111) | 9 |
| (1101000) | 83 |
| (1101001) | 18 |
| (1101010) | 126 |
| (1101011) | 39 |
| (1101100) | 44 |
| (1101101) | 36 |
| (1101110) | 14 |
| (1101111) | 31 |
| (1110000) | 58 |
| (1110001) | 94 |
| (1110010) | 69 |
| (1110011) | 78 |
| (1110100) | 17 |
| (1110101) | 125 |
| (1110110) | 35 |
| (1110111) | 13 |
| (1111000) | 93 |
| (1111001) | 68 |
| (1111010) | 124 |
| (1111011) | 34 |
| (1111100) | 67 |
| (1111101) | 123 |
| (1111110) | 122 |
| (1111111) | 121 |

For the present invention, a sequence embedded in the array of projected symbols must be long enough to avoid any ambiguity. Because of the epipolar geometry (which is described in more detail with FIG. 3), no ambiguity is possible between epipolar lines: the epipolar line to which an image point belongs determines the corresponding array epipolar line uniquely. The position of an array point within a given epipolar line in the image, on the other hand, depends on the geometry of the surface being imaged. Ambiguity is avoided as soon as K exceeds either the number of symbols in a row or the disparity range (measured in number of symbols).

If this is the case, and if a subsequence of length at least N symbols is observed within an image captured by the camera 120, the address of the subsequence can be determined.

FIG. 3 is a diagram illustrating the concept of epipolar geometry, as it applies to embodiments of the invention. The projector optical center 302 of the projector 110 (FIG. 1) and the camera optical center 304 determine a line in space that is called the baseline 310. Consider the set of all planes that contain the baseline 310. These are called the epipolar planes 312 of the camera-projector pair. Some of the epipolar planes 312 intersect the image area of the projector 110, as well as the rectangle of the camera 120. For instance, if a standard slide projector and a CMOS camera are used, some of the epipolar planes 312 will intersect the slide, and the same planes intersect the surface of the CMOS camera. The lines formed by these intersections are called epipolar lines in computer vision. The two lines formed by the intersection of a single epipolar plane with the projector plane 322 and camera plane 324 form an epipolar line pair. Note that all epipolar lines in the projector plane 322 meet at a point, which by construction is the intersection of the baseline 310 with the projector plane 322. This point is called the projector epipole 332. If the baseline 310 happens to be parallel to the projector plane 322, then the epipole is a point at infinity on the projector plane. Similarly, the epipolar lines in the camera plane 324 meet at the camera epipole 334, which is the intersection of the baseline 310 with the camera plane 324, and is a point at infinity if the camera plane 324 is parallel to the baseline 310.

Figure 4A:
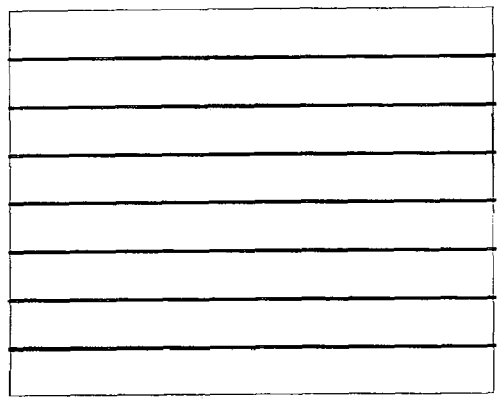
FIG. 4 illustrate row formation for different positions of a camera and projector in an image correspondence system.
Figure 4B:
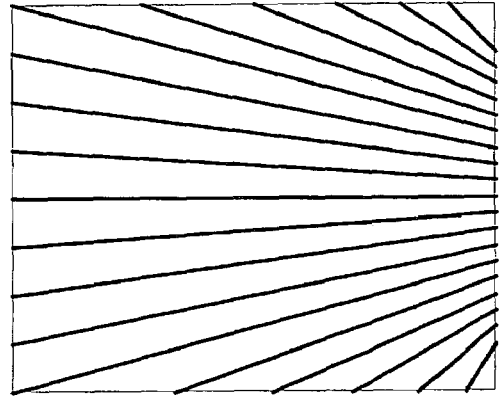

FIGS. 4A and 4B shows what array rows look like in two different cases. In FIG. 4A, the camera 120 is adjacent to the projector 110, and the optical axes of projector and camera are mutually parallel. In this case, both epipoles are points at infinity, and the array rows are mutually parallel lines. FIG. 4B shows the arrangement for when the camera 120 is on the side of the projector 110, but slightly ahead of it, so that the epipoles are finite points on both the projector and the sensor plane. The description provided in this document in general assumes that the configuration of the system in FIG. 1 will resemble the situation corresponding to FIG. 4A, since that configuration is easier than the configuration provided by FIG. 4B. It should be clear, however, that any camera and projector arrangement is possible, as long as the array rows on the projected pattern are oriented along the epipolar lines.

The importance of the epipolar geometry for embodiments described herein is that any point on a given epipolar line in the projector plane 322 must map onto the corresponding epipolar line in the camera plane 324. Thus, when the projector 110 projects an array of symbols onto scene 102, the points in a given row of the array can only move within their epipolar line in the image: no point can ever leave its epipolar line.

A curvilinear system of reference can be defined on the projected pattern by placing the origin, say, at the top left corner of it. Column coordinates increase along each epipolar line, and the row-coordinate gridlines are point-wise orthogonal to the epipolar lines. FIG. 4A shows that when the projector and camera are side-to-side with parallel optical axes, the coordinates form a standard, orthogonal, Cartesian system.

A final, useful element from the geometry of a projector-camera pair is the notion of disparity, which in turn requires the concept of a reference surface. Imagine placing a plane anywhere in the scene, with the only requirement that the same side of the plane be visible from the position of both the projector 110 and the camera 120. When the array of symbols is projected onto the reference plane, the camera 120 forms an image of it. This image induces a system of reference onto the image plane, in the sense that the array coordinates (r, c) of any point on the array can be also assigned to the image point to which the array point projects. Since the mapping between projector pattern points and image points is one-to-one within the visible portion of the array, this leads to a consistent assignment of coordinates to the image plane.

When a different surface replaces the reference plane, the image point with (array) coordinates (r,c) will generally be the projection of a different point of the array. As discussed above, and because of the epipolar geometry illustrated in FIG. 3, this other point has the same row coordinate r, but possibly a different column coordinate c'. The disparity at that image point is defined as the discrepancy between the column coordinates:

$$d=c'-c \qquad (2)$$

The values of disparity depend on where the reference surface is placed. On the other hand, the disparity range, that is, the difference between the smallest and greatest disparity that can be found at a given point in the array and for a particular projector/camera arrangement depends only on the workspace in which the system is to operate. This is because for a particular array point the reference column coordinate c cancels when computing the disparity range:

$$d_{max}-d_{min}=(c'_{max}-c)-(c'_{min}-c)=c'_{max}-c'_{min}.$$

From the disparity at a particular point in an image, it is possible to compute the three-dimensional position of the portion of the scene that projects to that point. The case of side-to-side camera 120 and projector 110 is, again, a particularly simple one. The extension to the general case is laborious but straightforward.

For side-to-side cameras, it is convenient to place the reference plane fronto-parallel, and at infinite distance. Then, zero disparity is obtained when the surface is infinitely far away.

FIG. 5 illustrates that for a plane at infinity the projector-plane point at array coordinates (r,c) projects onto the camera sensor at image coordinates:

$$(\rho, \gamma) = \frac{f_C}{f_P}(r, c),$$

where $f_P$ is the focal length of the projector and $f_C$ is that of the camera. Also, comparison of similar triangles in the figure readily yields the desired relationship between disparity and depth Z, measured along the common direction of the two optical axes, for a point on an arbitrary surface:

$$Z = f_P \frac{B}{d}.$$

In this expression, B is the length of the baseline, and $$d = c - \frac{f_P}{f_C}\gamma$$

is disparity.

To use this formula, it is necessary to know c, that is, the column address of the array point that happens to be visible at image position (ρ,γ). This is determined using methods such as described with FIG. 2. In this way, the depth of a particular point on the observed object 105 may be determined from the disparity (which requires knowing the column addresses and correspondences between the image and the projection array), and the spatial/geometric relationship between the projector 110 and camera 120.

Obtaining Depth From Correspondence

FIG. 6 illustrates a method for obtaining depth information for an observed object, using correspondence information and known relationships between the projector 110 and the camera 120. In step 610, sequence sets are generated that identify individual column addresses in the projection array 112. For example, a non-N-repeating sequence may be generated for elements of the projection array 112, as described with FIG. 2.

Step 620 provides that a sequence comprising the generated sequence sets are encored into the array of light emitted from the projector. In one embodiment, the non-repeating symbol sequences are embedded into a light pattern or structure projected onto the scene, so that subsequent examination of one of the sequences reveals the column position of that subsequence within its row of the array. In order to perform this step, three sub-steps may need to be performed: (i) the one-dimensional sequences are embedded into a two-dimensional array so that small image patches contain all the necessary information for address computation; (ii) an error-detection code is superimposed onto the sequence, in order to reveal missing or misread symbols; and (iii) binary symbols are encoded in a way that makes the symbols easily readable in an image of a scene lit with the array. Each of the subsets are described in greater detail below.

Step 630 provides that the coded array of light is cast onto the scene 102. For example, a light may be emitted through a slide that contains the sequence sets encoded into a grid provided on the slide.

In step 640, an image of the scene 102 is captured using the camera 120. The captured image is assumed to include an image of at least a portion of the projection array 112, which was used in casting the light onto the scene 102. The image of the projection array 112, however, may be distorted in that not all of the projection array may have been captured, and surfaces of the scene 102 may have altered portions of the projection array 112 as captured in the image.

In step 650, values are determined for elements in the array captured by the image. For example, the image of the scene with the structured or patterned light may be interpreted into a grid containing values identified from patterned light reflecting off of the scene 102. Thus, the contents of the array captured in the image correspond to at least a portion of the projection array 112. The resulting array of values may correspond to image array 122. For example, the sequence generated in step 610 may result in a string of binary values for the image array 122.

Step 660 provides that the row address for corresponding individual elements of the image array 112 to one of the elements of the projection array 122 are determined using known spatial and geometric relationships between the camera 120 and the projector 110. As described with FIG. 3, for example, rows in the image array 122 may have corresponding rows in the projection array 112.

Step 670 provides that the sequence sets are used to determine the column address for corresponding individual elements of the image array to one of the projection array elements. For example, sequence sets generated in step 610 may be decoded using a technique such as described with FIG. 2.

In step 680, depth information is determined for elements in the image array 112 using the row and column correspondence determined in step 660 and step 670. In one embodiment, triangulation techniques such as described in FIG. 5 may be employed to determine how far a region on the surface represented by an element of the image array 122 is from the camera 120. This distance may be determined by determining how the column coordinate of the image element differs from its corresponding projector element, as well as knowing a spatial relationship between the camera 120 and the projector 110.

A method such as described in FIG. 6 may be used to obtain a depth map of object 105. The depth map may correspond to an array that assigns a depth value to every element of the image array 122. The depth map may be determined at relatively quick time intervals, such as several times per second. The use of depth maps has various applications described below, such as facial recognition.

Embedding Binary Sequences into Projection Array

One of the subsets in step 620 of FIG. 6 is to encode a sequence comprising the subsets into the projection array 112. In general, many arrangements for encoding a sequence into an array, such as the projection array 112, are possible. The simplest makes all rows of the array the same, with the same non-repeating sequence in each row:

$s_0$  $s_1$  $s_2$  $s_3$ $s_0$  $s_1$  $s_2$  $s_3$ $s_0$  $s_1$  $s_2$  $s_3$ $s_0$  $s_1$  $s_2$  $\cdots$ Each column of the array would then encode one bit of the non-repeating sequence. This scheme is best suited for small values of N, the length of the non-repeating subsequence. For values of N greater than, say, 4 or 5, the address calculator would have to examine a long stretch of an array row to determine the address of the subsequence. The probability that an error is detected in such a stretch is relatively high, especially in the presence of numerous occlusions in the scene. As a result, many missing depth values would result as a consequence.

A better embedding scheme for greater values of N is to stagger subsequences in consecutive rows by the square root of N, rounded up to the next integer. For instance, for N=7, the subsequences are embedded as follows:

$s_0$  $s_1$  $s_2$  $s_3$ $s_3$  $s_4$  $s_5$  $s_6$ $s_6$  $s_7$  $s_8$  $s_9$ $s_9$  $s_{10}$  $s_{11}$  $\cdots$ In this arrangement, each row contains a Linear-Feedback Shift Register (LFSR) sequence, staggered by three elements relative to the previous row. Such a sequence has the property that for a particular prime integer N the sequence is $K=2^N-1$ bits long, and no subsequence of N bits is ever repeated within the sequence. Then, a complete address can be computed whenever at least seven consecutive symbols can be read. This is achieved with windows of size 1×7, 2×4, or 3×3 symbols, thereby substantially increasing the likelihood that at least one of these windows is error-free.

Detecting Missing or Misread Elements of the Projection Array

Coding the light from the projector 110 requires assigning an optically distinguishable attribute to each element of the projection array 112. For purpose of description, each element of the projection array 112 is said to be assigned a symbol representing a binary value. When projecting an array of symbols, it is possible, and even likely, that not all of the symbols will be projected or read correctly. For example, some of the following problems may arise: (i) not all projected symbols may be within the field of view of the camera 120, so that it may be difficult to determine which is the first (or last) symbol that is visible in the image;(ii) symbols may project on very dark parts of the surface, and become consequently invisible to the camera; (iii) symbols may project onto surface patches that are not visible from the camera's position (such symbols may be referred to as occluded symbols); and (iv) the shape of a symbol may become distorted, blurred, or otherwise corrupted beyond recognition.

To address these difficulties, the array of symbols projected onto the scene 102 may be endowed with two properties. The first property ensures that examination of a small pattern from the array allows computing the position or address of the pattern within the array itself. This may be achieved by designing the symbols in the array so that groups of symbols within the same row in the array are never repeated.

The second property allows checking whether the small pattern in question contains an unbroken sequence of contiguous symbols. This avoids problems that may be caused because of missing or misinterpreted symbols that interfere with the pattern address calculation mentioned above. This second property is enforced by the insertion of redundant symbols that implement an error-detecting code.

If these two properties are satisfied, a group of contiguous symbols in the image contains, so to speak, its own address: the arrangement of symbols in the group is unique to that particular group in that row of the projected array, and it cannot be confused with any other group. Correspondence between projected and imaged group can therefore be established. Standard triangulation, such as described in FIG. 5, may then be applied between individual points within the group of symbols in order to compute a high-resolution depth map of the scene 102.

One example of how a pattern of non-repeating symbols could be produced is as follows. Let $s_n$ be a bit in a so-called binary maximal-length LFSR. To fix the ideas, let N=7, and write out the sequence $s_1, \ldots, s_{127}$ of $K=2^N-1=127$ bits. No subsequence of N=7 bits ever repeats within these 127 bits. One way to write these bits into the projected pattern is to encode zeros with one type of symbol, and ones with another type. Several arrangements of the sequence into the array are possible.

Error detection can be used to reveal missing or misread symbols. This is a known technique in communication and storage systems. The simplest technique is to add a parity bit after every M bits in the sequence. This bit is the modulo-2 sum of the preceding M bits. A single error, occurring either in the M bits or in the parity bits, can be detected at reading time. To this end, the parity bit is recomputed and checked against the one read from the image. If the two bits differ, an odd number of errors must have occurred. Other techniques, such as Cyclic Redundancy Check (CRC) codes, may be used as well, but require larger blocks of symbols to be considered at once. Several error-detecting codes are discussed in W. W. Peterson and D. T. Brown, "Cyclic Codes for Error Detection," *Proc. IRE,* January 1961, pp. 228–235.

The most frequent cause of missing symbols is occlusion, where symbols projected onto part of the scene are hidden from the camera 120 by other parts of the scene 102, or, conversely, visible parts of the scene are not reachable from the projector because of other intervening objects. If these occlusions, or missing symbols caused by other problems, were to be ignored, it would be possible to read disconnected fragments of a sequence without realizing the lack of continuity. This would in turn yield a wrong subsequence address, incorrect disparity, and erroneous depth value.

One simple method to detect when symbols are missing or misread is to exploit the fact that adjacent rows contain the same subsequence, perhaps staggered as discussed in the previous section. For instance, one could check that symbols in the proper places coincide, as illustrated in FIG. 7.

Similarly, one can check coincidences in the windows of size 1×7, 2×4, or 3×3 symbols mentioned in the previous section, as illustrated in FIG. 8.

These checks, however, do not detect errors in the symbols in-between, unless the same checks are repeated for overlapping windows.

A more systematic alternative is to add symbols whose sole purpose is to detect errors. This is standard practice in the field of so-called error-detecting coding theory (see for instance A. S. Tanenbaum, *Computer Networks,* Prentice-Hall, 1996). A wide variety of error detection codes are used in many applications, such as checking the integrity of data on computer disk drives or at the receiver end of a noisy communication channel. Any of these coding schemes (parity bits, cyclic redundancy check codes, and others) can be used in our application as well. In the following, a scheme is presented that lends itself to effective embedding into the arrays used in the present invention.

Continuing the example with N=7, parity bits can be added on the margins of every 3×3 sub-array, as shown in FIG. 9. In FIG. 9, $b_0$ is the parity (i.e., the modulo-2 sum) of the three bits to its left, that is, $b_0=s_0 \oplus s_1 \oplus s_2$, and similar equations hold for $b_1,b_2,b_6,b_7,b_8$. Bits at the bottom of each column are parity bits for the three bits above them: $b_3=s_0 \oplus s_3 \oplus s_6$, and similar equations for $b_4,b_5,b_9,b_{10},b_{11}$. The special symbol denoted with d is different from the two symbols used to denote 0 and 1, and is used to delimit 4×4 blocks, so that parity bits can be distinguished from sequence bits.

Other error-detection schemes are possible as well. For instance, the column-parity bits (or the row-parity bits) could be skipped, different block sizes could be used, or functions other than parity could be computed for the additional bits. In general, a block of symbols is said to be addressable if its symbols satisfy all the error-detection checks, and if they are sufficient to determine the column address of the block within the array.

Computation of Depth at High Resolution

Once the validity of the bits encoded by a block of symbols within the array has been established, the sequence bits within that block can be used to determine the column address of the block within the array. The row address is determined from the epipolar geometry, as discussed earlier. These computations yield the coarse, symbol-level disparity of the block of interest, from which a crude estimate of depth can be made. A more precise determination of depth requires matching of individual array points and image pixels at a finer resolution.

Since the system at this point knows which symbol is which, this finer resolution can be achieved by computing disparities for each point on the boundary of each symbol. In each epipolar line in the image, a standard edge detection algorithm can be used to find the symbol boundaries, and brightness interpolation methods can compute the locations of these boundaries to better than pixel resolution. Methods for edge detection and sub-pixel interpolation are known in the art, and can be found in most books on computer vision or image processing (see for instance J. C. Russ, *The Image Processing Handbook,* CRC Press, 1999).

Depth of Non-Addressable Symbols

In some cases, a surface patch may be found to be non-addressable, because the bit block that covers it fails some of the error-detection checks, or because the patch contains too few bits. Such a patch is not necessarily lost to the depth sensor. For instance, a neighboring block may be addressable. If this is the case, the subsequence of the non-addressable block may be narrowed down to a small number of possibilities. Given this restriction, it is often possible to determine an address from fewer than N bits.

Identifiers for use with Projection Array

According to an embodiment, symbols, shapes and other optical identifiers that are projected onto scene 102 as part of the projection array 112 may require some of the following characteristics.

First, there needs to exist a sufficient number of distinct identifiers to satisfy coding requirements. In binary coding, for example, two or three distinct symbols are needed. Two identifiers are needed if only non-repeating sequences are encoded, and three if a delimiter symbol is used, as shown with FIG. 9.

Second, the identifiers should be readily distinguishable, particularly through the camera 120. For example, if symbols are used as the identifiers, the symbols should have high contrast to one another, so that each symbol's boundaries can be found accurately. Furthermore, the symbols may be bright, or brightly shaded, so as to be visible even when projected onto dark surfaces.

Third, distinct symbols must be clearly distinguishable in the image, even when they are projected onto slanted surfaces.

There are no fundamental restrictions as to the shapes of the symbols used as identifiers. The main design criterion is that different symbols should be distinguishable. However, the brightness and contrast requirements above suggest projecting binary images (that is, images with only two levels of brightness, black or white). If a symbol is thought of as being drawn into an ideal rectangle whose size is equal to the pitch of the array of symbols, it is desirable for the symbol to cover about half of the area of the rectangle. This maximizes contrast even with blurred images, and at the same time makes the distribution of symbol boundary points relatively uniform, leading to depth maps that are more evenly populated with data points.

The desire to have as many addressable blocks as possible imposes an upper limit on the size of symbols to use, since large blocks are more likely to straddle occlusions. However, this size limit depends on the application. For instance, a person's face contains few if any depth discontinuities, and the symbols can be relatively large (roughly speaking, a single addressable block could cover the entire face). On the other hand, to handle, say, hands appropriately, symbols would have to be small enough that an addressable block is likely to fit entirely on a finger.

The size of symbols in turn affects the required camera resolution: one symbol must cover enough pixels in the image that distinct symbols are easily distinguishable in the presence of complex surfaces, distortion, blurring, and image noise. FIG. 10 shows some examples of symbol shapes. In FIG. 10, any two of the shapes provided may be used to represent one of two binary values. Reliance on handedness (left) or shape differences (other symbol pairs) guarantees that different symbols can be distinguished even when they are projected onto slanted surfaces.

FIG. 11 shows another embodiment where the identifiers are blocks of different sizes. For example, a tall block may be assigned to represent a first binary value, and a shorter block may be assigned to represent a second binary value. The resulting image array may be analyzed to determine boundaries corresponding to each of the rectangular shapes.

Figure 12:
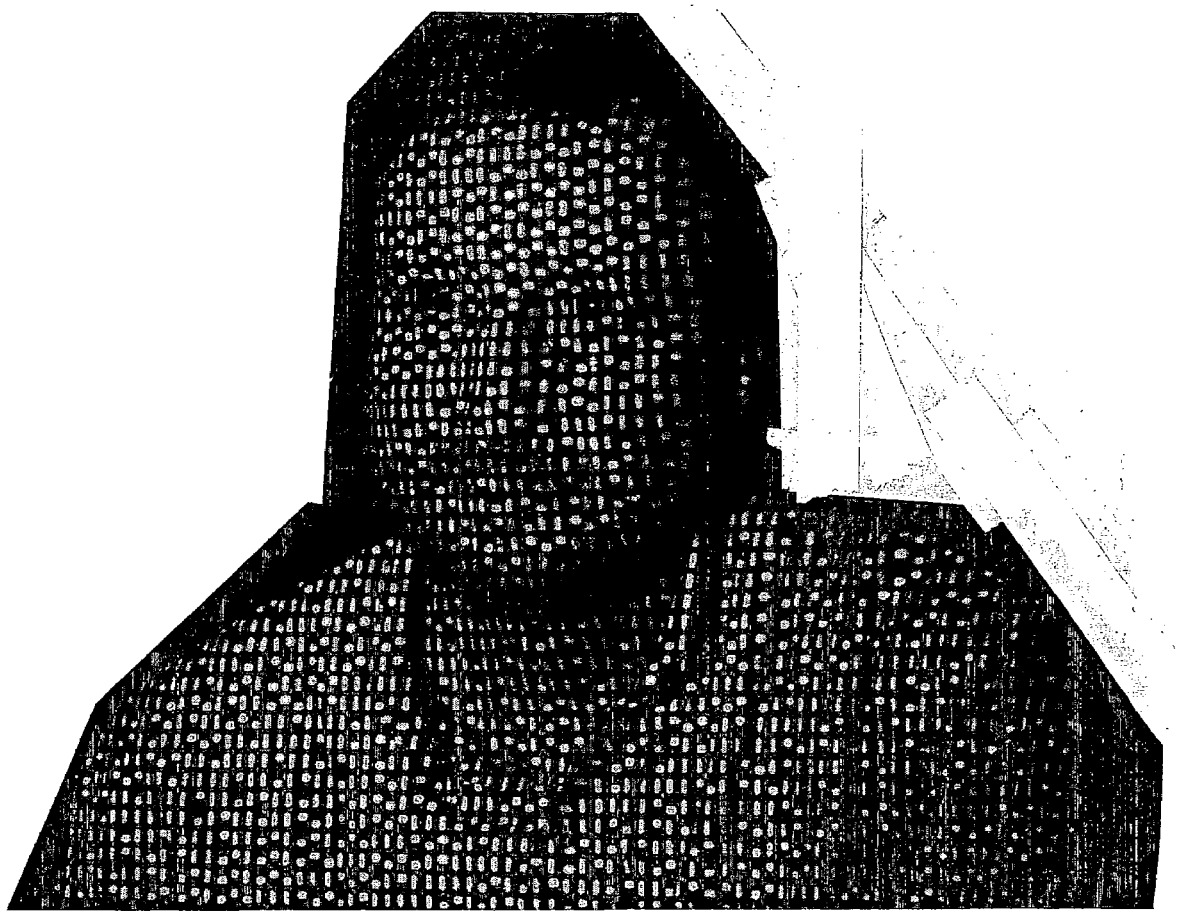
FIG. 12 illustrates an object encoded using a projection array with identifiers such as shown in FIG. 10, under an embodiment of the invention.

FIG. 12 illustrates a face in which a projection array is cast according to a coding scheme. In FIG. 12, the identifiers correspond to the shapes described with FIG. 11.

Calibration

With some embodiments, a calibration procedure may be performed to determine the image location of each identifier in the projection array for a scene containing only the reference plane. The map of all such image locations is called a reference map. This map matches points on the projector plane with points in the camera sensor plane, and is therefore a homography. It is known in the art that such a homography can be computed from a small number of points (see for instance Richard Hartley and Andrew Zisserman, *Multiple View Geometry in Computer Vision,* Cambridge University Press, Cambridge, UK, 2000).

With some embodiments, a calibration procedure may be performed to determine the image location of each identifier in the projection array for a scene containing only the reference plane. The map of all such image locations a reference map. This map matches points on the projector plane with points in the camera sensor plane, and is therefore a homography. It is known in the art that such a homography can be computed from a small number of points (see for instance Richard Hartley and Andrew Zisserman, *Multiple View Geometry in Computer Vision,* Cambridge University Press, Cambridge, UK, 2000).

Applications

Embodiments of the invention have several applications. For example, in one embodiment, an airbag deployment system may be provided in an automobile that can be tuned to the shape and size of the passenger. Information about the shape and/or size of the passenger may be determined from a depth map of the person's face or body. Such a depth map may be obtained by a sensor system that operates in a manner described with embodiments of the invention.

As another application, a facial recognition system may be provided that uses information about the facial shape and features of a person. Such information may also be obtained from a depth map, using sensors such as described for use with embodiments of the invention. Given sufficient depth information, the facial recognition system may be enhanced in its ability to separate a person's head from the background, or in its ability to provide three-dimensional head-shape parameters that can ease identification of the person.

Another application that can incorporate embodiments of the invention is a gesture recognition system. Using a sensor system such as described, depth information can be obtained regarding the pose, posture, gesture and/or movement of a person's extremities or other body parts. In this way, the user's hands, arms, and general upper body gestures can be interpreted as commands for some device. For example, the user's gestures may be interpreted as commands for a remote control or a virtual keyboard. Alternatively, a speech translation mechanism may be implemented that translates gestures corresponding to sign-language into speech.

Still another application for an embodiment of the invention is a three-dimensional sensor system that can separate foreground image from background image in a video stream. This allows the background image to be replaced or otherwise manipulated for visual effects.

Other applications may involve determining the shape of objects. For example, a virtual-reality system can be populated with virtual, three-dimensional objects, whose shape can be scanned by a three-dimensional sensor, such as provided herein. Thus, the objects of the virtual system may be designed through use of sensor systems that observe the physical world. Another application is to determine the shape of an object, such as a mechanical part or an art object. The calculated shape may be more readily represented by data, which in turn may be transmitted over a communication channel to a remote location.

On a larger scale, three-dimensional shapes can be usefully captured using depth information or three-dimensional systems, configured according to an embodiment of the invention. For example, sensors such as described may be used to capture an architectural survey, measure venues and locations for a variety of purposes, monitor traffic in order to assist drivers.

CONCLUSION

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for detecting characteristics of an object in a scene, the method comprising:

projecting a projection array, comprising a plurality of projection elements arranged in rows and columns, to project onto said scene and object coded light creating a pattern of said projection elements having a detectable characteristic that identifies a column in said projection array and belongs to a characteristic set of at least two characteristics, said pattern of projection elements being created from said projection array and defining a repeated pattern of staggered said columns;

capturing an image of said scene with said coded light projected onto said scene;

identifying a plurality of image elements forming an image array from a captured said image; and determining for each image element in a captured said image correspondence information useable to determine which projection element in said plurality of projection elements corresponds to that image element, wherein determining correspondence information for each element is performed independently of knowing correspondence information for any other image element.

2. The method of claim 1, further comprising determining position information for each identified image element based at least in part on correspondence information for said identified image element.

3. The method of claim 1, further comprising:
providing a protector to protect said projection array;
providing a camera to capture said image array; and
determining position information for each identified image element based at least in part on correspondence information for said identified image element and on a position of said projector relative to said camera.

4. The method of claim 1, wherein determining correspondence information includes determining a row coordinate and a column coordinate in said image array for at least one said image element based at least in part on a row coordinate and a column coordinate in said projection array.

5. The method of claim 1, wherein determining correspondence information includes:
determining a row coordinate and a column coordinate in said image array for at least one said image element; and
for each at least one said image element, determining a row coordinate and a column coordinate for an element in said projection array corresponding to said image element.

6. The method of claim 1, wherein determining correspondence information is performed absent prior determination of correspondence information for a calibration element in said plurality of image elements designated as calibrating correspondence information for all other image elements in said plurality of image elements.

7. The method of claim 1, wherein determining correspondence information is performed absent prior determination of correspondence information for an element in said plurality of image elements designated as being a first element in a sequence of elements that correspond substantially to an entire row of elements in said projection array.

8. The method of claim 1, wherein determining correspondence information includes identifying missing image elements by identifying at least one projection element lacking a corresponding image element in said image array.

9. The method of claim 8, further comprising compensating for missing image elements by using image elements congruent to said missing image elements.

10. The method of claim 1, wherein projecting a projection array is carried out with a projector and includes identifying data representing a tangible medium used to pattern light emitted from said projector.

11. The method of claim 1, further including:
providing a projector to protect said projection array; and
identifying a projection array includes identifying data representing a diffraction pattern for structuring light emitted from said projector.

12. The method of claim 1, wherein each characteristic in said characteristic set has a characteristic selected from a group consisting of (a) a geometric characteristic distinguishable from an other geometric characteristic in said set, (b) color from another color in said set, and (c) a shape distinguishable from another shape in said set.

13. The method of claim 1, further comprising:
determining a sequence of values that can identify each projection element in said projection array;
assigning a sequence value to each characteristic in said characteristic set; and
wherein projecting coded light includes projecting each projection element in projection array as a characteristic in said characteristic set so that said sequence can be at least partially reflected in said pattern based on sequence value assigned to each characteristic.

14. The method of claim 13, wherein assigning a sequence value includes assigning in a manner selected from a group consisting of (a) assigning a binary value, (b) assigning non-repeating binary values, (c) assigning using a non-N-repeating bit assignment formula, and (d) assigning a sequence subset to individual column coordinates so as to correspond elements in said projection array with elements in said image array.

15. The method of claim 1, wherein projecting coded light includes creating said pattern so that detectable characteristics identify columns in said projection array and so that each row in said projection array has a same set of columns.

16. The method of claim 1, further comprising using said staggered arrangement to determine which projection elements in said projection array lack a corresponding image element.

17. The method of claim 1, further comprising identifying rows in said image array that lack a same column to determine which projection elements in said projection array lack a corresponding image element.

18. The method of claim 1, wherein at least one method step is performed on at least one processor executing instructions stored on a computer-readable medium.

19. A system to detect characteristics of an object in a scene, the system comprising:
means for projecting a projection array, comprising a plurality of projection elements arranged in rows and columns, to project onto said scene and object coded light creating a pattern of said projecting elements having a detectable characteristic that identifies a column in said position array and belongs to a characteristic set of at least two characteristics, said pattern of projection elements being created from said projection array and defining a repeated pattern of staggered said columns;
means for capturing an image of said scene with said coded light projected onto said scene;
means for identifying a plurality of image elements forming an image array from a captured said image; and
means for determining for each image element in a captured said image information useable to determine which projection element in said plurality of protect elements corresponds to an image element, wherein determining correspondence information for each element is performed independently of knowing correspondence information for any other image element.

20. The system of claim 19, wherein said means for projecting includes a projector, and identifies data representing a tangible medium used to pattern light emitted from said projector.

21. The system of claim 19, wherein said means for projecting includes a projector and includes data representing a diffraction pattern for structuring light emitted by said projector.

22. The system of claim 19, a characteristic in said characteristic set has a characteristic selected from a group consisting of (a) a geometric characteristic distinguishable from an other geometric characteristic in said set, (b) a color from another color in said set, and (c) a shape distinguishable from an other shape in said set.

23. The system of claim 19, further including:
means for determining a sequence of values that can identify each projection element in said projection array;
means for assigning a sequence value to each characteristic in said characteristic set;
wherein said means for projecting projects coded light and projects each projection element in said projection array as a characteristic in said characteristic set so that said sequence can be at least partially reflected in said pattern based on sequence value assigned to each characteristic.

24. The system of claim 19, wherein a sequence value is assigned in a manner selected from a group consisting of (a) assigning a binary value, (b) assigning non-repeating binary values, (c) assigning using a non-N-repeating bit assignment formula, and (d) assigning a sequence subset to individual column coordinates so as to correspond elements in said projection array with elements in said image array.

25. The system of claim 19, wherein said staggered arrangement is used in determining which projection elements in said projection array lack a corresponding image element.

26. The system of claim 19, wherein said means for projecting projects coded light and creates said pattern so that detectable characteristics identify columns in said projection array and so that each row in said projection array has a same set of columns.

27. The system of claim 19, wherein said means for determining determines position information for each identified image element based at least in part on correspondence information for said identified image element.

28. The system of claim 19, wherein:
said means for identifying a projection array includes a projector;
said means for obtaining an image includes a camera; and
said means for determining determines position information for each identified image element based at least in part on correspondence information for said identified image element and on a position of a said protector relative to said camera.

29. The system of claim 19, wherein said means for determining determines a row coordinate and a column coordinate in said image array for at least one said image element based at least in part on a row coordinate and a column coordinate in said projection array.

30. The system of claim 19, wherein said means for determining determines a row coordinate and a column coordinate in said image array for at least one said image element; and
for each at least one said image element, determines a row coordinate and a column coordinate for an element in said projection array corresponding to said image element.

31. The system of claim 19, wherein said means for determining functions absent prior determination of correspondence information for a calibration element in said plurality of image elements designated as calibrating correspondence information for all other image elements in said plurality of image elements.

32. The system of claim 19, wherein said means for determining functions without prior determination of correspondence information for an element in said plurality of image elements designated as being a first element in a sequence of elements that correspond substantially to an entire row of elements in said projection array.

33. The system of claim 19, wherein said means for determining identifies missing image elements by identifying at least one projection element lacking a corresponding image element in said image array.

34. The system of claim 33, wherein said means for determining compensates for missing image elements by using image elements congruent to said missing image elements.

35. The system of claim 19, further including identifying rows in said image array that lack a same column to determine which projection elements in said projection array lack a corresponding image element.

36. The system of claim 19, further including identifying rows in said image array that lack a same column to determine which projection elements in said projection array lack a corresponding image element.

37. A system to detect characteristics of an object in a scene, the system comprising:
a projector to project a projection array, comprising a plurality of projection elements arranged in rows and columns, and to project onto said scene and object coded light creating a pattern of said projecting elements having a detectable characteristic that identifies a column in said position array and belongs to a characteristic set of at least two characteristics, said pattern of projection elements being created from said projection array and defining a repeated pattern of staggered said columns;
a camera to capture an image of said scene with said coded light projected onto said scene;
means for identifying a plurality of image elements forming an image array from a captured said image; and
means for determining for each image element in a captured said image information useable to determine which projection element in said plurality of project elements corresponds to an image element, wherein determining correspondence information for each element is performed independently of knowing correspondence information for any other image element.

* * * * *